Feb. 20, 1962 G. W. STANTON ET AL 3,022,264
COMPOSITIONS COMPRISING GRAFT COPOLYMERS OF N-VINYL LACTAM
MONOMERS ON ACRYLONITRILE POLYMER SUBSTRATES
AND METHOD OF MAKING SAME
Filed Jan. 29, 1958
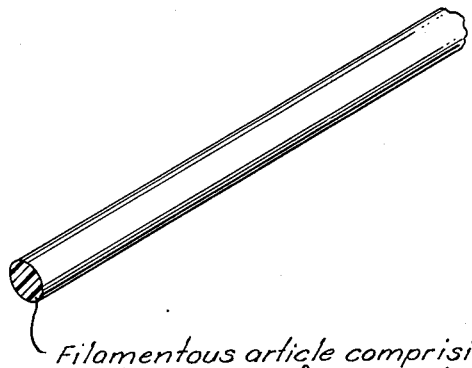
Filamentous article comprising a
graft copolymer of an N-vinyllactam
monomer on an acrylonitrile
polymer substrate.
INVENTORS.
George W. Stanton
Teddy G. Traylor
BY
Griswold & Burdick
ATTORNEYS

United States Patent Office 3,022,264
Patented Feb. 20, 1962

3,022,264
COMPOSITIONS COMPRISING GRAFT COPOLYMERS OF N-VINYL LACTAM MONOMERS ON ACRYLONITRILE POLYMER SUBSTRATES AND METHOD OF MAKING SAME
George W. Stanton, Walnut Creek, and Teddy G. Traylor, Concord, Calif., assignors to The Dow Chemical Company, Midland, Mich., a corporation of Delaware
Filed Jan. 29, 1958, Ser. No. 711,929
9 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft, or block-type, copolymers that are comprised of N-vinyl lactam monomers polymerized on acrylonitrile polymer substrates.

Hydrophobic polymeric materials of varying origin are commonly employed in the manufacture of various synthetic shaped articles including films, ribbon, fibers, filaments, yarns, thread and the like and related structures, which hereinafter will be illustrated with particular reference to fibers. Polymers and copolymers of acrylonitrile which contain in the polymer molecule at least about 80 percent by weight of combined acrylonitrile units may be utilized with great advantage for such purposes. Difficulty is often encountered, however, in suitably dyeing synthetic hydrophobic fibers and the like that have been prepared from acrylonitrile polymers, especially those that are comprised essentially of polyacrylonitrile. This is especially so when it is attempted to obtain relatively deeper shades of coloration in the finally dyed product.

Various techniques have been evolved for providing acrylonitrile polymer compositions of improved dyeability. These include copolymerizing acrylonitrile with various monomeric materials which are intended to lend an enhanced dye-receptivity to the copolymeric product; blending polyacrylonitrile or other acrylonitrile polymers with one or more dye-receptive polymeric materials prior to formation of a fiber product or to the shaped article; and impregnating an already-formed acrylonitrile polymer fiber or other shaped article with a dye-assisting adjuvant or dye-receptive agent, which frequently may be a polymeric material.

The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified acrylonitrile polymers, particularly polyacrylonitrile. Also, such products, once they have been prepared, may not be as receptive as might be desired to a wide range of dyestuffs, due to inherent limitations in the materials capable of being employed for enhancing dye-receptivity. In addition, especially when textile fiber products are involved, treatment or modification of the acrylonitrile polymer article in any of the indicated known ways may not always permit uniform penetration of the dye throughout the cross-section of the fiber. Frequently, the articles which have been modified according to known procedures may exhibit an undesirable tendency to accept a dyestuff only in their peripheral portions. When this phenomenon occurs (which, in connection with fiber products, is ordinarily referred to as ring-dyeing), fibrillation of the fiber, such as normally results from its use, exposes the uncolored interior portions. Such behavior, of course, is undesirable and objectionable in fabrics and other textile materials constructed with fibers of the acrylonitrile polymers.

It would be advantageous, and it is the chief aim and concern of the present invention, to provide acrylonitrile polymers which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified acrylonitrile polymer substrates, and of the general order obtainable with unmodified polyacrylonitrile. This would possibilitate the manufacture of acrylonitrile polymer based fibers and the like articles having the highly desirable combination of attractive physical characteristics and substantial capacity for and acceptance to dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which is comprised or consists essentially of an acrylonitrile polymer substrate having a minor proportion of substituents graft copolymerized thereto consisting essentially of polymerized N-vinyl lactam monomers. Schematically, the compositions may be structurally represented in the following manner:

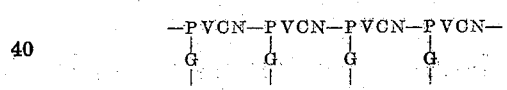

wherein the interlinked "PVCN" symbols represent the acrylonitrile polymer substrate or trunk and the symbols "G" connected thereto the substituent graft copolymer branches of the indicated N-vinyl lactam monomer provided thereon.

As is apparent, the graft copolymer substituent that is combined with the acrylonitrile polymer substrate lends the desired receptivity of and substantivity for various dyestuffs to the compositions while the acrylonitrile polymer trunk substrate that is so modified facilitates and secures the excellent physical properties and characteristics of the various shaped articles, including fibers into which the compositions may be fabricated. Advantageously, as mentioned, the acrylonitrile polymer substrate that is modified by graft copolymerization to provide the compositions of the invention contains in the polymer molecule at least about 80 percent by weight of combined acrylonitrile. More advantageously, the acrylonitrile polymer substrate consists substantially or essentially of polyacrylonitrile.

It is usually beneficial, as has been indicated, for the graft copolymer compositions of the present invention to contain a major proportion of the acrylonitrile polymer trunk or substrate that has been modified with the substituent dye-receptive graft copolymer groups chemically attached thereto. As a general rule, for example, it is desirable for the graft copolymer to be comprised of at least about 80 percent by weight of the acrylonitrile polymer substrate. In many instances, it may be satisfactory for the graft copolymer composition to be comprised of between about 85 and 95 percent by weight of the acrylonitrile polymer substrate, particularly when it is polyacrylonitrile. In this connection, however, better dyeability may generally be achieved when the grafted vinyl lactam polymer substituents are prepared under such conditions that they have relatively long chain lengths. Thus, it is usually preferable, when identical quantities of grafted substituent are involved, for relatively fewer, but longer chain length grafts to be available than to have a greater number of substituents of relatively shorter chain length.

The vinyl lactam monomers which are utilized to modify the acrylonitrile polymer substrates so as to provide the graft copolymer compositions of the present invention may be any of those (or their mixtures) which are variously characterized and generically known to the art as N-vinyl or 1-vinyl lactams. Such monomers as have been described and are involved in U.S. Patents Nos. 2,265,450; 2,317,804; and 2,335,454 may be suitably employed in the practice of the invention. Advantageously, the N-vinyl lactam monomers that are employed are N-vinyl-2-pyrrolidone (which may also be referred to as N-vinyl-2-pyrrolidinone) or N-vinyl caprolactam, particularly the former. Excellent results may also be obtained with such N-vinyl lactam monomers as N-vinyl-5-methyl-2-pyrrolidone; N-vinyl piperidone; N-vinyl-3,3-dimethyl-pyrrolidone; N-vinyl-3,3-dimethyl piperidone; N-vinyl-hexahydrophthalimidine; N-vinyl-naphthostyrile; and the like.

As mentioned, the graft copolymer compositions of the invention have remarkably good dye-receptivity, particularly in view of their acrylonitrile polymer origin. In most cases, for example, the dye-receptivity of the graft copolymer of the present invention is improved to such an extent in comparison with unmodified acrylonitrile polymers, particularly unmodified polyacrylonitrile, that a color differential of at least about 40 Judd units, as hereinafter illustrated, may readily be obtained between samples of the unmodified acrylonitrile polymer substrate and the graft copolymer compositions of the present invention, each of which have been dyed at a 4 percent dyeing according to conventional techniques, with such a dyestuff as Calcodur Pink 2BL. This is a significant advantage when the compositions are fabricated into shaped article form, especially when they are prepared in a filamentary form that is suitable for use as a textile material.

The Judd unit is described by D. B. Judd in "American Journal of Psychology," vol. 53, page 418 (1939). More applicable data appears in "Summary on Available Information on Small Color Difference Formulas," by Dorothy Nickerson, in "American Dyestuff Reporter," vol. 33, page 252, June 5, 1944. Also see "Interrelation of Color Specifications," by Nickerson, in "The Paper Trade Journal," vol. 125, page 153 for November 6, 1947.

As is well known, Calcodur Pink 2BL is a direct type of dye that has a Colour Index 353. It is commercially obtainable under the indicated trade-designation. The same dyestuff, which is the sodium salt of 3,3'-disulpho-diphenylurea-4,4'-diazobis-2 - amino - 8 - naphthol-6-sulfonic acid, is actually available (frequently under other commercial designations) from several sources. Calcodur Pink 2BL has the following structural formula, as is given on page 88, section A, part IV, of the "Colour Index" (1st ed., 1924) published by the (British) Society of Dyers and Colourists:

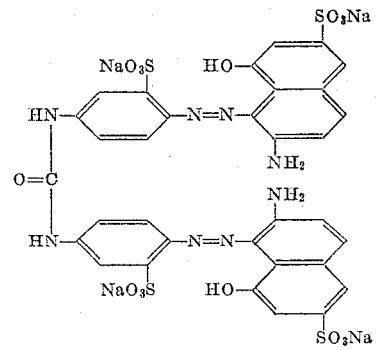

More recently, this dyestuff has been designated Colour Index Direct Red 75.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, direct, naphthol, and sulfur dyes. Such dyestuffs, in addition to the particular variety mentioned, by way of didactic illustration, as Calcocid Alizarine Violet (Colour Index 61710, formerly Colour Index 1080), Sulfanthrene Red 3B (Colour Index Vat Violet 2), Amacel Scarlet BS (Colour Index 11110), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5GLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (both Colour Index Dispersed Red 15), Celanthrene Pure Blue BRS 400 percent (Colour Index Dispersed Blue 1) and Acetamine Yellow N (Colour Index Dispersed Yellow 32); B-naphthol←2- chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole FIGURE of the hereto annexed drawing.

The dye-receptive graft copolymers of the present invention may be prepared and provided by impregnating the acrylonitrile polymer substrate with the monomeric substance, then polymerizing the monomer in situ in the acrylonitrile polymer substrate. Advantageously, this may be accomplished when the substrate is in the form of an already shaped article, such as a fiber filamentary structure. Beneficially, the graft copolymerization of the impregnated monomer may be accomplished and facilitated with the assistance of a polymerization catalyst or catalyzing influence which preferentially interacts with the substrate in order to establish or form grafting sites thereon and simultaneously or subsequently initiate the graft copolymerization. As a practical matter, it is generaly most desirable to form the graft copolymer compositions in such manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated acrylonitrile polymer substrate to a field of high energy radiation in order to efficiently provide an effectively attached graft copolymer of the polymerized monomeric impregnate on the hydrophobic acrylonitrile polymer substrate. Thus, the graft copolymer compositions of the present invention may advantageously be provided in accordance with the general procedure that is described in copending application for United States Letters Patent of George W. Stanton and Teddy G. Traylor having Serial No. 553,701, filed December 19, 1955, disclosing a "Process for Treating Shaped Polymeric Articles to Improve Dyeability." Specifically, the graft copolymer compositions of the present invention may be provided with exceptional advantage under the influence of high energy irradiation by preparing them in accordance with the particular method of Charles A. Levine and Teddy G. Traylor that is disclosed in the copending application for an "Improved Method for Radiation Graft Copolymerization of N-vinyl Lactam Monomers on Acrylonitrile Polymer Substrates" having Serial No. 683,685, that was filed on September 13, 1957.

The monomer may be intimately impregnated in the acrylonitrile polymer substrate in any desired manner prior to the graft copolymerization. Thus, the monomer may be directly applied or it may be applied from dispersion or solution in suitable liquid vehicles until a desired monomer content has been obtained. Ordinarily, it is advantageous for the monomer to be diluted in a solvent or dispersant vehicle so as to provide a treating bath in which to impregnate the acrylonitrile polymer substrate with the latter being immersed in the bath for a sufficient period of time to attain a desired monomer content adequate for the intended purpose. The acrylonitrile polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the acrylonitrile polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition. It is generally advantageous to prepare the compositions of the present invention by impregnating the monomer into the acrylonitrile polymer substrate while the latter is in a water-swollen or hydrated aquagel condition, prior to being finally converted to a dried polymer structure. Such aquagels may be obtained by forming the shaped acrylonitrile polymer articles from the acrylonitrile polymer while it is dissolved in an aqueous saline solution thereof (such as a 60 percent by weight aqueous zinc chloride solution) as by coagulation in a suitable aqueous liquid bath capable of having such effect. When impregnating baths of the monomer are employed, it is generally desirable for them to have a monomer concentration of between about 0.5 and 50 percent by weight and to be prepared as an aqueous solution of the monomer. This is particularly the case when the acrylonitrile polymers in an aquagel condition are being impregnated. The impregnation of acrylonitrile polymer fibers and related shaped articles from such a bath may be continued until between about 0.5 and 20 or so percent by weight of the monomer, based on the weight of the acrylonitrile polymer substrate, is incorporated in the substrate. Obviously, unfabricated polymers may be impregnated in an analogous manner. Ordinarily, an impregnating bath having a monomer concentration of between about 5 and 15 percent by weight may advantageously be employed to impregnate the acrylonitrile polymer substrate with monomer to an amount or extent between about 5 and 15 percent by weight of the polymer substrate.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage, as has been disclosed in the referred-to copending application of Levine and Traylor, to accomplish the graft copolymerization at temperatures between about 20 and 60° C. utilizing relatively low dose rates and total dosages of the high energy for the desired purpose.

When the graft copolymer compositions are prepared from preformed or already shaped acrylonitrile polymer substrates that are successively impregnated with the monomer, which is then graft copolymerized in situ in the shaped article, excess monomer, if desired may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfates, etc. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to, upon and with the acrylonitrile polymer substrate being modified in order to provide the compositions of the present invention.

For purposes of specifically illustrating, without intending to thereby limit the invention, the following didactic examples are provided wherein, unless otherwise indicated, all parts and percentages are to be taken by weight.

EXAMPLE 1

Several samples of a salt-spun, wet-stretched acrylonitrile polymer in aquagel form were saturated with various aqueous solutions of monomeric N-vinyl-2-pyrrolidone. Each of the solutions had independently differing monomer concentrations.

The polyacrylonitrile aquagel fiber, which contained about two parts by weight of water in the gel phase to each part by weight of dry polymer in the aquagel structure, had been obtained by extruding a spinning solution comprised of about 10 parts of polyacrylonitrile dissolved in about 90 parts of a 60 percent aqueous solution of zinc chloride into an aqueous coagulating bath that contained about 42 percent of zinc chloride dissolved therein. A multiple filament tow was prepared in the spinning operation by extruding the spinning solution through a spinnerette having 750 round orifices, each of about 6 mil diameter. The coagulated tow bundle was washed substantially free from salt, after having been withdrawn from the coagulating bath. Prior to being impregnated with the monomeric vinyl lactam solution, it was wet-stretched for purposes of orientation to a total stretched length that was about twelve times its original extruded length.

The impregnation with the aqueous solutions of the vinyl lactam monomer was performed by passing continuous endless lengths of the tow through a bath of monomer solution which was protected from the air by being blanketed under a nitrogen atmosphere. After impregnation, the saturated aquagel fiber was handled in nitrogen until it was subsequently irradiated by exposure at room temperature to a high energy, X-ray radiation beam from a Van de Graaff electrostatic generator operating under a potential of two million electron volts with a 250 microampere beam current impinging on a tungsten target. The irradiation was also performed in a nitrogen atmosphere. The impregnation of the tow bundle and its immediately subsequent passage through the beam was continuously performed on the endless length of the moving tow. The monomer impregnated fiber was subjected to the high energy at a dose rate of about 14,000 roentgen equivalent physicals (rep.) per minute. After irradiation, the samples were rinsed, irreversibly dried to convert them from the aquegal condition to finished fiber form and then heat set at 150° C. for 5 minutes. The finally obtained fibers were of about three denier size and had a tenacity of about 3.5 grams per denier, a wet strength of about 2.5 grams per denier and an elongation of about 35 percent.

Each of irradiated graft copolymer fibers was then dyed with 4 percent Calcodur Pink 2BL for about one hour at the boil in a sodium sulfate-containing bath according to conventional procedure in which the dyestuff was present in the bath in an amount that was equal to about 4 percent of the weight of the fiber; the sodium sulfate was present in the bath in an amount equal to about 15 percent by weight of the fiber; and weight ratio of bath-to-fiber was about 30:1. After being dyed, each sample was rinsed in water and dried for about 20 minutes at 80° C. The dye-receptivity of each fiber sample was evaluated by spectrophotometrically measuring the monochromatic light having a wave length of about 520 millimicrons from a standard source that was reflected from each sample after it had been dyed with 4 percent Calcodur Pink 2BL. A numerical reflectance value was thereby obtained along a numerical scale from 0 to 100. The reflectance value in each case represented the relative comparison of the amount of light that was reflected from the dyed sample with that which was reflected from a standard white tile reflector having an arbitarily assigned reflectance value according to the numerical scale used of about 316.

As is well known in the art, lower reflectance values are an indication of better dye-receptivity in a given fiber sample. For example, a reflectance value of about 20–25 for acrylonitrile polymer synthetic fibers dyed with 4 percent Calcodur Pink 2BL is generally considered by those skilled in the art to represent a degree of dye-receptivity that readily meets or exceeds the most rigorous practical requirements and is ordinarily assured or receiving general commercial acceptance and approval. The percentage of N-vinyl-2-pyrrolidone graft copolymer that was formed on the polyacrylonitrile substrate was determined by infra-red spectroscopy techniques. In the following tabulation there is set forth a summary of the experimental results which were obtained with each of the samples. The symbol "VP" stands for N-vinyl-2-pyrrolidone monomer and the expression "PVP" indicates N-vinyl-2-pyrrolidone graft copolymer. The improvement in color yield, as represented by the Judd Unit differential between the samples in a dyed and undyed condition, is also included.

*Table 1*

FORMATION AT ROOM TEMPERATURE UNDER IRRADIATION OF N-VINYL-2-PYRROLIDONE GRAFT COPOLYMERS ON POLYACRYLONITRILE FIBERS

| Sample No. | Concentration VP, percent | Radiation dose in reps | Dyed color of irradiated fiber | Reflectance value | Percent PVP in irradiated fiber | Color yield improvement, Judd units |
|---|---|---|---|---|---|---|
| A1 | 1 | 0 | None | >100 | 0 | ¹25 |
| A2 | 1 | 25,000 | Light | 100 | 2.85 | ¹25 |
| A3 | 1 | 50,000 | ---do--- | 100 | 4.16 | ¹25 |
| A4 | 1 | 100,000 | ---do--- | 100 | 3.4 | ¹25 |
| A5 | 5 | 0 | None | 100 | 0 | ¹25 |
| A6 | 5 | 25,000 | Light | 70 | 3.82 | 47 |
| A7 | 5 | 50,000 | Medium | 55 | 7.50 | 52 |
| A8 | 5 | 100,000 | ---do--- | 30 | 10.12 | 62 |
| A9 | 10 | 0 | None | 100 | 0 | ¹25 |
| A10 | 10 | 25,000 | Medium | 45 | 6.79 | 56 |
| A11 | 10 | 50,000 | ---do--- | 30 | 12.32 | 62 |
| A12 | 10 | 100,000 | Dark | 9 | 16.19 | 70 |
| A13 | 98 | 0 | None | 100 | 0 | ¹25 |
| A14 | 98 | 25,000 | Light | 70 | 5.4 | 47 |
| A15 | 98 | 50,000 | Medium | 30 | 10.5 | 62 |
| A16 | 98 | 100,000 | Dark | 9 | 17.0 | 70 |

¹ About.

EXAMPLE 2

The procedure of Example 1 was identically repeated with several different samples excepting to conduct the radiation at a temperature of 46° C. instead of at room temperature. The results are set forth in the following Table 2.

*Table 2*
FORMATION AT 46° C. UNDER IRRADIATION OF N-VINYL-2-PYRROLIDONE GRAFT COPOLYMERS ON POLYACRYLONITRILE FIBERS

| Sample No. | Concentration VP, percent | Radiation dose in reps | Dyed color of irradiated fiber | Reflectance value | Percent PVP in irradiated fiber | Color yield improvement, Judd units |
|---|---|---|---|---|---|---|
| B1 | 10 | 30,000 | Medium | 50 | 8.20 | 54 |
| B2 | 10 | 50,000 | do | 35 | 7.40 | 59 |
| B3 | 10 | 75,000 | Dark | 12 | 10.45 | 68 |
| B4 | 20 | 50,000 | Medium | 19 | 11.25 | 65 |
| B5 | 20 | 75,000 | Dark | 9 | 16.0 | 70 |

EXAMPLE 3

Following the procedure of the first example and using a 10 percent aqueous solution of monomeric N-vinyl-2-pyrrolidone, several additional samples were prepared. The temperature, however, at which the irradiation of each sample was conducted was varied. The results are set forth in the following Table 3.

*Table 3*
FORMATION AT VARIOUS TEMPERATURES UNDER IRRADIATION OF N-VINYL-2-PYRROLIDONE GRAFT COPOLYMERS OF POLYACRYLONITRILE FIBERS

| Sample No. | Temperature of irradiation, °C. | Radiation dose in reps | Dyed color of irradiated fiber | Reflectance value | Color yield improvement, Judd units |
|---|---|---|---|---|---|
| C1 | 20 | 0 | None | 100 | <25 |
| C2 | 20 | 10,000 | Light | 80 | 43 |
| C3 | 20 | 25,000 | Medium | 60 | 51 |
| C4 | 20 | 50,000 | do | 25 | 63 |
| C5 | 20 | 100,000 | Dark | 9 | 70 |
| C6 | 30 | 0 | None | 100 | <25 |
| C7 | 30 | 10,000 | Light | 80 | 43 |
| C8 | 30 | 25,000 | Medium | 55 | 52 |
| C9 | 30 | 50,000 | do | 20 | 64 |
| C10 | 30 | 100,000 | Dark | 9 | 70 |
| C11 | 47 | 0 | None | 100 | <25 |
| C12 | 47 | 10,000 | Light | 75 | 45 |
| C13 | 47 | 25,000 | Medium | 45 | 56 |
| C14 | 47 | 50,000 | Dark | 9 | 70 |
| C15 | 47 | 100,000 | do | 9 | 70 |

EXAMPLE 4

A sample of polyacrylonitrile aquagel fiber similar to that employed in Example 1 was impregnated with a 10 percent aqueous solution of N-vinyl-2-pyrrolidone in accordance with the procedure set forth in the first example until the fiber became saturated with the aqueous solution. The sample was then irradiated in a high energy electron beam from a Van de Graaff generator operating at 2 million volts and one microampere beam current at a dose rate of 22,000 rep. per minute until a total dose of 57,800 rep. of electrons was obtained. After being dried, the resulting fiber sample had a reflectance value of 15 when dyed with 4 percent Calcodur Pink 2BL in the manner indicated in the foregoing. Another similarly impregnated sample was irradiated by electrons in accordance with the procedure set forth in Example 1 by X-rays from the Van de Graaff generator operating as defined in the first example to provide a dose rate of 14,000 rep. per minute until a total radiation dose of 63,500 rep. of X-ray radiation was obtained. The finally obtained graft copolymer-containing fiber had a reflectance value of 9 when dyed with 4 percent Calcodur Pink 2BL. The color yield improvement between the fiber in a dyed and undyed condition was about 70 Judd units.

EXAMPLE 5

Using the conditions set forth in Example 1, excepting to employ a 20 percent aqueous solution of monomeric N-vinyl-2-pyrrolidone. A comparison was made using several different samples of the same polyacrylonitrile aquagel fiber as employed in the first example of the effects of different radiation dosages applied at varying rates. The results are set forth in the following Table 4.

*Table 4*
FORMATION UNDER DIFFERENT DOSAGES AT VARYING RATES UNDER IRRADIATION OF N-VINYL-2-PYRROLIDONE GRAFT COPOLYMERS ON POLYACRYLONITRILE FIBERS

| Sample No. | Radiation dose rate, reps per minute | Radiation dose in reps | Dyed color in irradiated fiber | Reflectance value | Percent PVP in irradiated fiber | Color yield improvement, Judd units |
|---|---|---|---|---|---|---|
| D1 | 14,000 | 25,000 | Medium | 30 | 11.11 | 61 |
| D2 | 14,000 | 50,000 | Dark | 15 | 15.28 | 66 |
| D3 | 14,000 | 75,000 | do | 9 | 18.01 | 70 |
| D4 | 4,400 | 10,000 | Medium | 60 | 7.3 | 50 |
| D5 | 4,400 | 25,000 | do | 25 | 12.56 | 63 |

EXAMPLE 6

Three samples of polyacrylonitrile aquagel fiber similar to that employed in the first example were independently impregnated with a 10 percent aqueous solution of monomeric N-vinyl-2-pyrrolidone-containing 0.25 percent of sodium sulfite and 0.25 percent of sodium tribasic phosphate. The radiation of each sample was accomplished in the manner set forth in Example 1, using a radiation dose rate of about 14,000 rep. per minute at a temperature of 50° C. In the treatment of each of the samples, the monomeric impregnating bath for the aquagel tow was located outside the shielded area of the Van de Graaff generator. After being saturated with monomer, the tow was pulled through the shielding into the radiation field. This technique was resorted to for purposes of minimizing or eliminating prepolymerization of the monomeric N-vinyl-2-pyrrolidone that was dissolved in the impregnating bath.

One of the samples was subject to a total radiation dosage of about 20,000 rep. It dyed to a medium shade with 4 percent Calcodur Pink 2BL and, after dyeing, had a reflectance value of about 19. The second sample was subjected to a total radiation dose of 30,000 rep. It dyed to a dark shade with 4 percent Calcodur Pink 2BL and had a reflectance value of about 11. The second sample was found to contain about 9.8 percent of the N-vinyl-2-pyrrolidone graft copolymer on the polyacrylonitrile substrate. The third sample was given a total dose of 40,000 rep. It dyed to a dark shade with the Calcodur Pink 2BL; was found to have a reflectance value of about 10.

EXAMPLE 7

A wet-stretched polyacrylonitrile aquagel fiber was soaked in an aqueous 10 percent solution of monomeric N-vinyl-2-pyrrolidone that had been flushed thoroughly by sparging with carbon dioxide. The monomer-saturated aquagel fiber was exposed to gamma radiation from a cobalt-60 source at a dose rate of about 1800 rep. per minute until a total dose of about 110,000 rep. of gamma radiation had been obtained in a one-hour period. The irradiated sample was rinsed, dried and heat set for 5 minutes at 150° C., then dyed with 4 percent Calcodur Pink 2BL. It was found to have a reflectance value of 13 and a color yield improvement of about 57 Judd units.

EXAMPLE 8

The impregnating procedure of Example 7 was repeated to obtain an N-vinyl-2-pyrrolidone monomer-saturated polyacrylonitrile aquagel fiber. The saturated fiber sample was exposed to electrons generated from a linear accelerator operating at a potential of 10.5 million electron volts until a total dosage of 230,000 rep. of electrons was obtained at a dose rate of 41,000 rep. per minute. The sample was rinsed, dried, heat set for 5 minutes at 150° C. and dyed with 4 percent Calcodur Pink 2BL. A reflectance value of 58 was observed in the dyed fiber sample.

EXAMPLE 9

An oriented polyacrylonitrile aquagel fiber that contained about 1 part of polymer hydrated with 2 parts of water was soaked for 15 minutes in a 10 percent aqueous solution of N-vinyl-2-pyrrolidone to absorb about 20 percent of the monomer. The wet fiber was then irradiated by being exposed at a distance of about 1 centimeter from a Machlett OEG-50 tube that was being operated at 50,000 volts and 50 milliamperes. The exposure was continued for about 25 minutes. The irradiated yarn was then rinsed, dried, heat set for 5 minutes at 150° C., scoured and dyed with 4 percent Calcodur Pink 2BL for one hour at the boil. The fiber was completely and evenly penetrated by the dyestuff. Its reflectance value was 10. Similarly treated but non-irradiated fibers were stained only slightly by the same dyeing procedure, having a reflectance value of 110. Both the radiated and non-radiated fiber samples had the same physical properties. The color differential between the dye-receptive irradiated fibers and the non-irradiated fibers (both given the same 4 percent Calcodur 2BL dyeing treatment) was about 40 Judd units.

EXAMPLE 10

The procedure of Example 9 was repeated with a number of samples excepting to use different concentrations of the monomer in the impregnating bath for some of the fiber samples and to vary the radiation exposure time and conditions. The results are set forth in the following tabulation.

*Table 5*

FORMATION USING VARIED X-RAY EXPOSURES OF N-VINYL-2-PYRROLIDONE GRAFT COPOLYMERS OF POLYACRYLONITRILE FIBERS

| Sample No. | Percent monomer in bath | Radiation exposure time, minutes | Voltage on tube KV | Current in tube ma | Reflectance value with 4 percent Calcodur Pink 2 BL | Color differential from Non-irradiated sample, "N" Judd units |
|---|---|---|---|---|---|---|
| E1 | 10 | ½ | 50 | 50 | 100 | 15 |
| E2 | 10 | 1 | 50 | 50 | 67 | 32 |
| E3 | 10 | 3 | 50 | 50 | 9 | 56 |
| E4 | 10 | 5 | 50 | 50 | 10 | 56 |
| E5 | 10 | 5 | 30 | 50 | 9 | 56 |
| E6 | 10 | 3 | 30 | 50 | 22 | 51 |
| E7 | 10 | 1 | 30 | 50 | 100 | 15 |
| E8 | 10 | 5 | 50 | 25 | 11 | 55 |
| E9 | 10 | 3 | 50 | 25 | 27 | 50 |
| E10 | 5 | 5 | 50 | 50 | 64 | 37 |
| E11 | 7.5 | 5 | 50 | 50 | 25 | 50 |
| E12 | 20 | 2 | 50 | 50 | 10 | 56 |
| E13 | 30 | 2 | 50 | 50 | 10 | 56 |
| E14 | 0 | 0 | 0 | 0 | 100 | 15 |

Samples "D" and "J" were found, by nitrogen analysis, to contain 11.3 and 7.8 percent of poly-N-vinyl-2-pyrrolidone, respectively.

EXAMPLE 11

A 2 gram sample of oriented polyacrylonitrile aquagel fiber containing polymer to water in a 1:2 weight ratio, respectively, was soaked, for about 30 minutes, in a 60 percent aqueous solution of N-vinyl-2-pyrrolidone until the fiber contained about 65 percent of the monomer. The impregnated fibers were then irradiated according to the procedure of Examples 8 and 1, excepting to space the wet fibers about 11 centimeters from the tube. After irradiation, the swollen fibers (which contained about 65 percent of combined poly-N-vinyl-2-pyrrolidone were extracted with boiling water, and dried. The water-insoluble residue was dissolved in dimethyl formamide (DMF) and found by infra-red analysis to contain 60 percent poly-N-vinyl-2-pyrrolidone. Since poly-N-vinyl-2-pyrrolidone itself is quite soluble in boiling water, the foregoing indicates rather definitely that the dye-receptive polymer was chemically attached by graft copolymerization to the polyacrylonitrile substrate.

EXAMPLE 12

A graft poly-N-vinyl-2-pyrrolidone polyacrylonitrile copolymer fiber sample was prepared as in Example 11, excepting to use a 25 percent aqueous solution of the monomer for impregnation. The radiated product was insoluble in a 62 percent aqueous zinc chloride solution. Normal poly-N-vinyl-2-pyrrolidone and polyacrylonitrile and polymer blends thereof are soluble in such aqueous saline solutions.

EXAMPLE 13

The procedure of Example 8 was repeated excepting to use cobalt 60 as the source of irradiation and to impart a 0.11 mrep. dosage of the impregnated fibers therewith. The 4 percent Calcodur Pink 2BL reflectance value of the product was about 13. When the procedure was again repeated excepting to obtain a 2 mrep. dose at a rate of 23 mrep. per minute from a two million electron volt Van de Graaff generator, the irradiated fiber product had a reflectance value of 10.

EXAMPLE 14

A 5 part wet-stretched sample of a wet-spun polyacrylonitrile fiber was immersed in an aqueous bath containing, in about 94 parts of water, about 5.9 parts of N-vinyl-2-pyrrolidone; about 0.035 part of 30 percent aqueous hydrogen peroxide and about 0.11 part of concentrated aqueous ammonia. The sample was maintained in the bath at a temperature of about 75° for about four hours, after which time it was removed, washed with water, dried, heat set at 150° C. and scoured.

The treated fiber sample was dyed at the boil for about one hour in a bath containing 8 percent Xylene Milling Black, an acid dyestuff, and about 15 percent sodium sulfate, and 5 percent acetic acid, based on the weight of the fiber. The dye-bath-to-fiber ratio employed was about 30:1. The dyed fiber was removed from the bath, rinsed thoroughly and dried at 100° C. for about one-half hour. A deep, level coloration was observed in the fiber which proved, upon photomicrographic examination, to obtain substantially throughout the fiber cross-section.

In comparison, a similar untreated sample of a fiber comprised of a copolymer of acrylonitrile and about 3 percent vinyl pyridine was dyed in the same manner. A substantially less intense coloration resulted. Photomicrographic study of the dyed samples displayed an undesirable ring dyeing effect to have occurred in the untreated fiber.

EXAMPLE 15

A 5 part wet-stretched sample of a wet-spun polyacrylonitrile fiber was treated by being impregnated with N-vinyl-2-pyrrolidone monomer which was polymerized in situ in accordance with the procedure set forth in Example 14. The treated fiber sample was dyed with 4 percent Calcodur Pink 2BL in the conventional manner delineated in the foregoing. After dyeing, the fiber was removed from the bath and rinsed thoroughly in water before being dried for about one-half hour at 100° C. The sample was brightly colored and the dyeing occurred throughout the fiber cross-section without noticeable evidence of ring dyeing having taken place. Its color yield improvement was about 30 Judd units.

In contrast, an untreated wet-stretched sample of a wet-spun polyacrylonitrile fiber dyed poorly when using the foregoing same dyeing procedure. The untreated fiber showed distinct evidence of being ring dyed.

EXAMPLE 16

A 5 part wet-stretched sample of a wet-spun polyacrylonitrile fiber was immersed in the same treating bath containing N-vinyl-2-pyrrolidone as described in Example 14. The fiber was removed from the bath after about 15 minutes and squeezed to a damp-dry condition. Polymerization of the impregnated N-vinyl-2-pyrrolidone was completed in a steam chamber under about 15 p.s.i.g. steam pressure for about 30 minutes, after which it was washed, dried, heat-set and secured.

An analysis of the fiber sample showed it to contain about 3.6 percent of poly-N-vinyl-2-pyrrolidone. Separate parts of the sample were dyed with Xylene Milling Black and Calcodur Pink 2BL according to the procedures set forth in Examples 14 and 15, respectively. In each case the dyeing was level and deep. There was a substantially complete concentration of the dye throughout the fiber. The crockfastness of the dyed samples, according to the standard AATCC test, was 5.

In comparison, a similar fiber sample was treated in an aqueous bath containing about 0.4 percent of poly-N-vinyl-2-pyrrolidone, held at about 25° C. and having a hydrochloric acid-maintained pH of about 3. The sample absorbed about 9 percent of the poly-N-vinyl-2-pyrrolidone. The polymer treated sample was dyed in the same manner with the acid and the direct dye as the monomer impregnated sample. Inferior dyeing results were observed in the polymer treated fiber as compared to the fiber treated with monomer. In the polymer treated fiber, the coloration was less intense and evidence of ring dyeing were apparent. The AATCC crockfastness of the polymer treated sample was about 2.

EXAMPLE 17

The treatment of Example 14 was repeated on a similar fiber sample as therein described excepting that the impregnating bath contained about 10 parts of N-vinyl-2-pyrrolidone. The treated sample, when dyed with 4 percent Calcodur Pink 2BL, displayed intense and fast coloration with no evidence of ring dyeing having occurred.

EXAMPLE 18

A sample of stretched and dried polyacrylonitrile fiber was placed in a treating bath consisting of about 20 parts of N-vinyl-2-pyrrolidone and 0.2 part of hydrogen peroxide in 150 parts of diethyl ether. After about 30 minutes, the ether was removed by evaporation at 50° C. The impregnated fiber was then heated to about 120° C. for one-half hour after which it was heat set at about 150° C. for 5 minutes. The resultant fiber had excellent dyeability and washfastness without displaying tendencies to ring dye when it was dyed with either acid, direct, acetate or vat dyes.

Excellent results, commensurate with those demonstrated in the foregoing, may also be obtained when the above-described procedures are duplicated with any of the N-vinyl lactam monomers or mixtures thereof indicated as being within the scope of the invention and when the graft copolymer compositions are prepared with other than polyacrylonitrile substrates, including any of the acrylonitrile copolymers known to the art, which have been indicated to be within the scope of the invention.

What is claimed is:

1. Dye-receptive graft copolymer composition comprised of (1) an acrylonitrile polymer substrate which is a polymer of polymerizable, acrylonitrile-containing, ethylenically unsaturated monomeric material that has in the polymer molecule at least about 80 weight percent of polymerized acrylonitrile, having chemically attached through carbon linkages thereto a minor proportion of up to about 20 weight percent, based on composition weight, of substituent graft copolymerized units consisting of (2) polymerized N-vinyl lactam monomers.

2. The composition of claim 1, wherein said acrylonitrile polymer substrate has up to about 5 and 15 percent by weight, based on the weight of the composition, of said substituent graft copolymerized units attached thereto.

3. The composition of claim 1, wherein said acrylonitrile polymer substrate is polyacrylonitrile.

4. The composition of claim 1, wherein said substituent graft copolymer units are comprised of polymerized N-vinyl-2-pyrrolidone.

5. The composition of claim 1, wherein said substituent graft copolymer units are comprised of polymerized N-vinyl caprolactam.

6. The composition of claim 1, wherein said acrylonitrile polymer substrate is polyacrylonitrile and wherein said substituent graft copolymerized units are present in an amount up to about 20 percent by weight, based on the weight of the composition, and are comprised of polymerized N-vinyl-2-pyrrolidone.

7. A filamentary shaped article comprised of the composition set forth in claim 6.

8. A filamentary shaped article comprised of the composition set forth in claim 1.

9. A method for the preparation of a dye-receptive graft copolymer composition, which method comprises polymerizing a minor proportion of an N-vinyl lactam monomer in the presence of a preformed acrylonitrile polymer substrate, which preformed polymer is a polymer of polymerizable, acrylonitrile-containing, ethylenically unsaturated monomeric material that has in the polymer molecule at least about 80 weight percent of polymerized acrylonitrile; said polymerization being continued until up to about 20 weight percent, based on resulting composition weight, of polymerized N-vinyl lactam graft copolymer substituents are formed on said acrylonitrile polymer substrate.

References Cited in the file of this patent

UNITED STATES PATENTS

| 2,643,990 | Ham | June 30, 1953 |
| 2,790,783 | Coover | Apr. 30, 1957 |
| 2,794,793 | Coover | June 4, 1957 |
| 2,837,496 | Vandenberg | June 3, 1958 |